Patented Nov. 14, 1950

2,530,217

UNITED STATES PATENT OFFICE 2,530,217

CONDUCTIVE COATING COMPOSITIONS

Lewis A. Bain, Jr., Berwyn, Ill., assignor, to Western Electric Company, Incorporated, New York, N. Y., a corporation of New York No Drawing. Application April 4, 1946,
Serial No. 659,663

1 Claim. (Cl. 106—49)

This invention relates to coating compositions and more particularly to conductive coating compositions for non-conducting heat resistant bases.

In the processing of quartz crystals for certain electrical apparatus, it is necessary to apply a solder receptive conductive coating on the surfaces of the crystals. For certain types of communication work the conductive coating on the crystals must be uniform and relatively thin to prevent any appreciable increase in the mechanical inertia of the crystal and to maintain the natural vibration nodes of the crystal. It has been found that silver possesses many properties desirable for these coatings. However, the previously used processes for applying a silver coating on crystals have been either very expensive or hard to control.

It is an object of this invention to provide a new, inexpensive and uniform conductive coating composition for non-conducting heat resistant bases.

In accordance with one embodiment of this invention, a composition of silver flakes and a glass flux carried in a water soluble temporary binder, such as methyl cellulose is sprayed on the surface of a crystal after which the crystal is placed in a furnace and heated to a temperature sufficient to fuse the glass flux thereby forming a metallic conductive coating on the crystal consisting predominately of silver bonded to the crystal by the glass.

In the preferred embodiment of this invention the metallic flakes may be silver powder or flakes having maximum dimensions of 40 microns and having a minimum purity of 90%. Because of the methods employed, commercially processed silver flakes are ordinarily coated with stearates and in order to dissolve the stearates the metallic flakes are mixed with the glass flux and any water-miscible solvent for stearates and milled together in a porcelain ball mill until the glass flux is uniformly dispersed. Usually 24 to 48 hours of milling is sufficient depending on the fineness of the ingredients. Some of the water-miscible solvents for stearates are acetone, ethyl alcohol or methyl alcohol. If stearates are not present on the silver flakes, then the solvent therefor may be dispensed with and the metallic flakes and glass flux may be mixed together with the water soluble binder as hereinafter described.

Any glass flux may be used if it will melt at temperatures that will not injure the base on which it is being applied and if it will adhere to the base when fused. Since the metallic coating contemplated herein is to be applied to quartz crystals, the glass flux should be a low softening point glass to prevent damage to the quartz crystal due to excessive heat in the later described firing step. Preferably the softening point should be less than 1000° F. A glass flux having the following composition was successfully used in the preferred embodiment of the invention:

| Component | Parts by Weight | | |
| --- | --- | --- | --- |
| | Maximum | Minimum | Preferred |
| | Per cent | Per cent | Per cent |
| $PbO$ | 94 | 75 | 82.5 |
| $B_2O_3$ | 12 | 5 | 11.4 |
| $PbF_2$ | 5 | 0 | 5.0 |
| $SiO_2$ | 7 | 0 | 1.1 |

$PbO$ and $B_2O_3$ are basic components of low melting point glass. $PbF_2$ is added as a modifier to promote better adherence to the quartz and $SiO_2$ is a modifier which is added to improve properties of the flux. The ingredients of the glass flux are mixed together and heated until melted whereupon the melted mixture is allowed to flow into relatively cold water to "shatter" the flux. Before mixing it with the metallic flakes, the glass flux is further ground by suitable means to pass a 325 mesh screen.

A water soluble temporary binder dissolved in water is then added to the mixture of silver flakes and glass flux and the whole is milled in a ball mill until the mixture is homogeneous. Usually 16 to 24 hours of milling is sufficient. The temporary binder may be any water-soluble resin or gum which will produce solutions of high viscosity. The following binders have been found suitable: Methyl cellulose, carboxy methyl cellulose, polyvinyl alcohol and gum arabic.

The final composition may have a composition varying within the limits set forth in the following examples:

Example I

| Ingredients | Parts by Weight | |
| --- | --- | --- |
| | Maximum | Minimum |
| | Per Cent | Per Cent |
| Stearate coated silver flakes | 40 | 30.0 |
| Glass flux | 4 | 1.5 |
| Water soluble resinous binder | 2 | .5 |
| Water | 68 | 27.0 |
| Acetone | 32 | 5.0 |

The amount of acetone necessary varies with amount of stearates on the silver flakes.

Example II

| Ingredients | Parts by Weight |
|---|---|
| | Per cent |
| Stearate coated silver flakes | 32 |
| Glass flux | 3 |
| Water soluble resinous binder | 1 |
| Water | 32 |
| Acetone | 32 |

Example III

| Ingredients | Parts by Weight | |
|---|---|---|
| | Maximum | Minimum |
| | Per Cent | Per Cent |
| Silver flakes | 40 | 30.0 |
| Glass flux | 4 | 1.5 |
| Water soluble resinous binder | 2 | .5 |
| Water | 68 | 27.0 |

Example IV

| Ingredients | Parts by Weight |
|---|---|
| | Per cent |
| Silver flakes | 32 |
| Glass flux | 3 |
| Water soluble resinous binder | 1 |
| Water | 64 |

The composition may then be applied to the crystal surface by any practicable method, for example, by spraying. Where the applied coating must be very thin and uniform, spraying provides the best controlled method of application. The coated crystal is then air dried to remove the solvent, after which the coated crystal is fired at between 950° F. and 1000° F. for 2 to 5 minutes to volatilize solids in the binder and to fuse the glass flux so that it is bonded to the crystal.

The use of a water soluble binder in crystal coating compositions makes it easier to control the quantity applied thereby making the application more uniform. The solids have less tendency to settle out and the resin content produces less disruption of the film during the firing step. Since the composition contains a large percentage of water, it is practically non-flammable and is convenient to use since tools can be cleaned in water and repairs can be facilitated by dissolving any unfired coating composition in water. The resulting coating is firmly bonded to the quartz and is not only a good conductor but will readily bond with solder. While the binders of examples III and IV as stated hereinbefore do not require any acetone or other solvent for stearates, it may be advisable to add acetone to expedite the air drying of the composition.

Although the invention as described herein relates to its use with quartz, it may be used in conjunction with glass, mica, ceramic or any non-conducting heat resistant base. Metallic flakes formed from any of the noble or relatively chemically inert metals such as silver, gold, platinum, copper, nickel, etc. may be used depending on the desired or permissible incidence of corrosion.

What is claimed is:

A composition for forming an electrically conductive coating on a dielectric surface comprising from 30% to 40% of silver flakes having maximum dimensions of 40 microns; from 1.5% to 4% of glass flux consisting of 75% to 94% of lead oxide, 5% to 12% of boric oxide, up to 5% lead fluoride, and up to 7% of silica; a water soluble resinous binder from .5% to 2%; and the balance a vehicle consisting essentially of water.

LEWIS A. BAIN, JR.

REFERENCES CITED

The following references are of record in the file of this patent:

UNITED STATES PATENTS

| Number | Name | Date |
|---|---|---|
| 2,103,598 | Smith | Dec. 28, 1937 |
| 2,457,158 | Koch | Dec. 28, 1948 |
| 2,461,878 | Christensen et al. | Feb. 15, 1949 |

FOREIGN PATENTS

| Number | Country | Date |
|---|---|---|
| 566,718 | Great Britain | (1945) |